Oct. 17, 1950                F. DIEBOLD                2,526,203
                           TROUSER-HOLDER
                         Filed Feb. 17, 1948
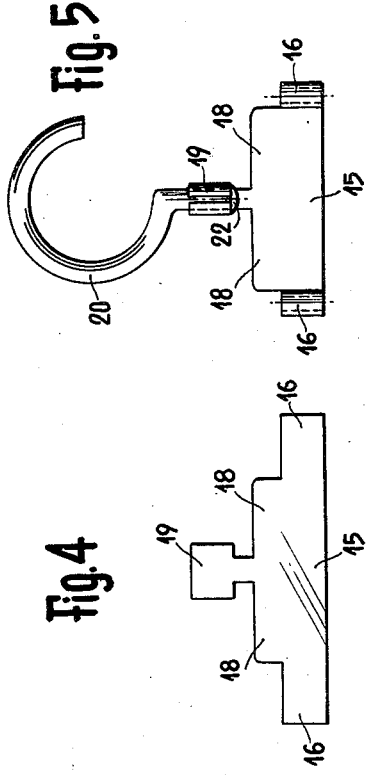
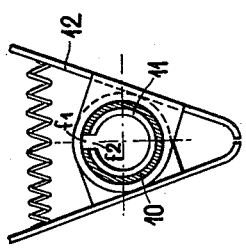
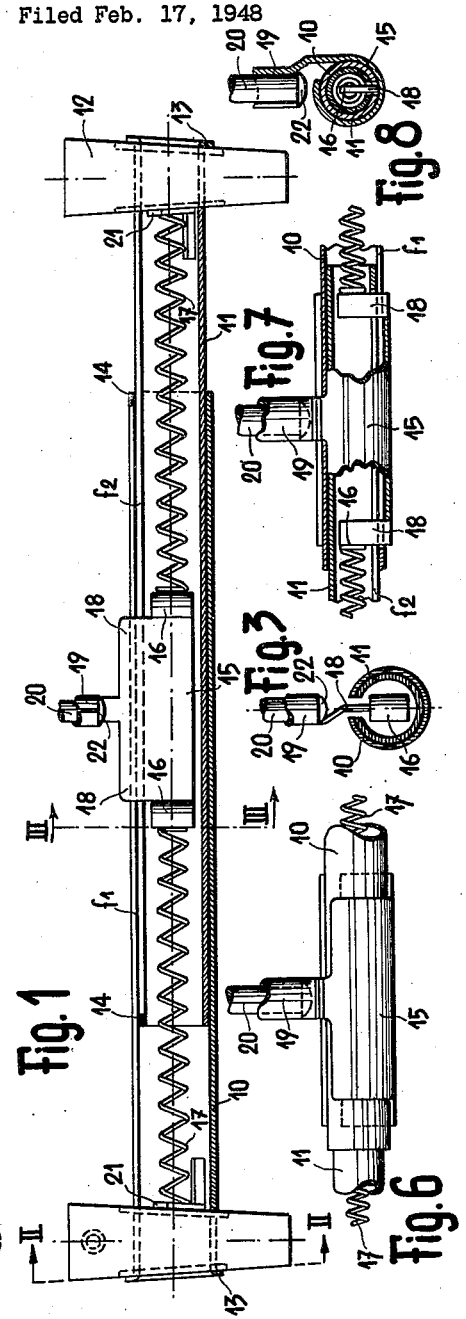
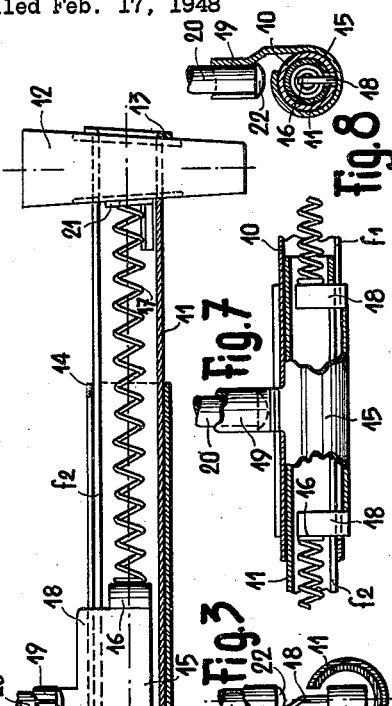
INVENTOR
FRITZ DIEBOLD,
BY
ATTORNEY Patented Oct. 17, 1950

2,526,203

UNITED STATES PATENT OFFICE 2,526,203

TROUSER HOLDER

Fritz Diebold, Geneva, Switzerland, assignor to Robert Baumann & Cie, Geneva, Switzerland, a corporation of Switzerland Application February 17, 1948, Serial No. 8,820
In Switzerland February 19, 1947

5 Claims. (Cl. 223—96)

The present invention relates to a trouser-holder provided with two clips fitted at the ends of a support of adjustable length and a slide carrying a suspension part.

This trouser-holder differs from the known trouser-holders by the fact that the support is constituted by two tubes having a lengthwise slit and telescoping one into the other with friction due to their elastic deformation, the slide being constituted by a part fastened to the suspension part and having at least one guide engaged in the slits of the tubes, two identical springs fixed, on one hand to the slide, and, on the other hand, to the ends of the tubes carrying the clips, tending to keep the suspension part at an even distance from the said clips.

The attached drawing shows diagrammatically and by way of example two forms of execution of the object of the invention.

Fig. 1 is a longitudinal cross-section of a first form of execution;

Fig. 2 is a cross-section of same through the line II—II of the Fig. 1;

Fig. 3 is a cross-section of same through the line III—III of the Fig. 1;

Figs. 4 to 5 are views of details;

Fig. 6 is a part view of a second form of execution;

Fig. 7 is a part view of same in longitudinal cross-section;

Fig. 8 is a transversal cross-section view.

Referring to Figs. 1 to 3, one sees that the support is constituted by two metal tubes 10 and 11 having a fully lengthwise slit and telescoping one into the other with friction due to their elastic deformation, which keeps them in the chosen relative position.

On the end of each tube is fitted a spring clip 12, to which the tube acts as axle, that is to say on which swivel the two branches of the clip, as shown on Fig. 2. The end of each tube is set back on 13 so as to form a collar tending to keep the clip in position.

The slit $f_1$, $f_2$ of each tube is closed at its end opposite to that carrying the clip by a drop of solder 14.

Inside the tubes 10 and 11 is housed a body 15 constituted by a part made of sheet metal and represented in detail on Fig. 4. The ends 16 of this part are folded back as shown on the Fig. 5 in order to form supports for the springs 17 (Fig. 1).

The body 15 includes a guide 18 engaged in the slits $f_1$ and $f_2$ of the tubes 10 and 11 and carrying a projection 19 of which the folded back edges form a hooking device intended to keep the end of a hook 20 in forming a bearing into which the said hook can turn (Fig. 5). The end of the hook tail has a head 22 which forms a rest as regards the bearing.

The body 15 slides freely inside the two tubes 10 and 11 and the springs 17 rest, on one hand, on its folded back ends 16, and, on the other end, on a tongue portion 21 cut into the wall of each tube and pushed back inside of it.

Since the two springs 17 have practically the same strength, the body 15 together with the hook 20 is automatically kept fairly in the middle plane of the support, that is to say at a fairly even distance from each of the clips 12.

Moreover, it is easy to modify and choose the friction value between the tubes 10 and 11 due to their elastic deformation. These frictions are so chosen that the combined strength of the two united springs 17 shall be smaller than these frictions. Thus, when the user places the two tubes in a certain axial relative position, these remain in this position, the springs not being able to overcome the frictions. However, in certain cases, one can also provide springs capable of overcoming these frictions. In this case, one gets a trouser-holder which opens automatically. It is clear that in this latter case, it is necessary, in order to avoid stretching the trouser's fabric, to make sure that the two combined springs are but very little stronger than the frictions.

It is clear that the described form can vary in its details without going out of the scope of the invention. Thus the clips might be different from those represented. The body 15 could also be made in another way. For instance, it could come from manufacture with already formed rests for the springs.

In the alternative form of execution shown on Figs. 6 to 8 the body 15 is arranged outside the tubes 10 and 11. It has the general form of a slit cylinder having at each of its ends an arm 18 radially arranged. These two arms constitute the guide of the body 15. They are engaged in the slits $f_1$ and $f_2$. In addition, each of these arms carries a support for the springs 17. As is the case in the form of excution shown on the Figs. 1 to 3, the body 15 has a hooking device 19 for the hook 20. Parts 15, 18—20, 22 of either modification constitute suspension means.

In the two represented and described forms of execution, the body 15 constitutes indeed a slide carrying the hook 20 and having a guide engaged is the slits $f_1$ and $f_2$. The hook 20 is automatically kept at an even distance from the clips 12 thanks to the action of the springs 17.

I claim:

1. A trouser-holder comprising a pair of clips, a pair of members slidable lengthwise of one another and elastically deformable and holding one another in a predetermined position because of the friction due to the deformation, suspension means engageable with at least one of the members and spring means each connected at one end to the suspension means and at the other end to one of the members, the strength of the spring means being less than that required to overcome the friction between the members.

2. The trouser-holder according to claim 1 and wherein the members are tubular and in telescopic relation to one another and lengthwise slotted and the suspension means is slidable in the slots.

3. The trouser-holder according to claim 2 and wherein the suspension means is disposed within the inner-most tube.

4. The trouser-holder according to claim 1 and wherein the members are tubular and an inwardly extending tongue is formed on each to anchor the outer end of a spring.

5. A trouser-holder, comprising, a pair of clips, a pair of members slidable lengthwise of one another and elastically deformable and holding one another in a predetermined position because of the friction due to the deformation, suspension means embracing the outer one of the members and having opposite arms, and spring means each connected at one end to an arm of the suspension means and at the other end to one of the members, the strength of the spring means being less than that required to overcome the friction between the members.

FRITZ DIEBOLD.

REFERENCES CITED

The following references are of record in the file of this patent:

UNITED STATES PATENTS

| Number | Name | Date |
|---|---|---|
| 1,247,551 | Lendle | Nov. 20, 1917 |
| 2,221,296 | Cavanagh | Nov. 12, 1940 |